US008286270B2

(12) United States Patent
Higgins

(10) Patent No.: US 8,286,270 B2
(45) Date of Patent: Oct. 16, 2012

(54) HELMET HAVING A GUIDING MECHANISM FOR A COMPATIBLE VISOR

(75) Inventor: Danny Higgins, Chambly (CA)

(73) Assignee: Danastem Sports Enr., St-Basile-le-Grand, Québec (CA)

( * ) Notice: Subject to any disclaimer, the term of this patent is extended or adjusted under 35 U.S.C. 154(b) by 115 days.

(21) Appl. No.: 12/720,195

(22) Filed: Mar. 9, 2010

(65) Prior Publication Data

US 2010/0229288 A1 Sep. 16, 2010

(30) Foreign Application Priority Data

Mar. 16, 2009 (CA) ..................................... 2658238

(51) Int. Cl.
- A42B 1/24 (2006.01)
- A42B 3/18 (2006.01)
- A42B 1/08 (2006.01)
- F41H 1/04 (2006.01)
- A61F 9/00 (2006.01)

(52) U.S. Cl. .................. 2/422; 2/6.3; 2/6.7; 2/424; 2/15

(58) Field of Classification Search .................. 2/410, 5, 2/6.1, 6.2, 6.3, 6.4, 6.5, 6.6, 6.7, 422, 424, 2/425, 15, 10, 12, 13, 426, 427, 428, 440, 2/9, 171, 206, 209.13; D29/102, 103, 106, D29/107, 108, 110

See application file for complete search history.

(56) References Cited

U.S. PATENT DOCUMENTS

| | | | | | |
|---|---|---|---|---|---|
| 2,301,050 | A | * | 11/1942 | Kelley | 2/10 |
| 2,302,231 | A | * | 11/1942 | Lobelle | 2/10 |
| 2,649,019 | A | * | 8/1953 | Hartline et al. | 359/409 |
| 2,762,051 | A | * | 9/1956 | Finken | 2/427 |
| 2,903,700 | A | * | 9/1959 | Finken et al. | 2/10 |
| 2,936,458 | A | * | 5/1960 | Luisada | 2/435 |
| 3,066,305 | A | * | 12/1962 | Aileo | 2/431 |
| 3,081,460 | A | * | 3/1963 | Miller | 2/431 |
| 3,128,469 | A | * | 4/1964 | Lobelle | 2/6.3 |
| 3,262,125 | A | * | 7/1966 | Bowen | 2/6.7 |
| 3,473,166 | A | * | 10/1969 | Lobelle | 2/6.5 |
| 3,495,273 | A | * | 2/1970 | Aileo | 2/6.4 |
| 3,585,638 | A | * | 6/1971 | Aileo | 2/410 |

(Continued)

FOREIGN PATENT DOCUMENTS

DE 29915934 7/2000

(Continued)

Primary Examiner — Shelley Self
Assistant Examiner — Jane Yoon
(74) Attorney, Agent, or Firm — France Côté; Benoit & Côté, Associés Inc.

(57) ABSTRACT

A helmet for receiving a compatible visor comprises a shell and two guiding mechanisms. Each guiding mechanisms is located on a different side of the shell and is adapted to receive the compatible visor. The guiding mechanisms guide the compatible visor along a confined path extending from a retracted position, where the compatible visor is proximate a frontal portion of the shell and substantially outside a field of view of the wearer, to a deployed position where the compatible visor is substantially below a frontal lower edge and within the field of view of the wearer. The guiding mechanisms guide at least a lower portion of the compatible visor substantially towards a rear portion of the shell when the compatible visor is in the deployed position. The compatible visor has a lens, a face seal and one mounting interface on each side of the lens.

6 Claims, 9 Drawing Sheets

U.S. PATENT DOCUMENTS

| | | | | |
|---|---|---|---|---|
| 3,601,813 A | * | 8/1971 | Aileo | 2/410 |
| 3,636,565 A | | 1/1972 | Luisada et al. | |
| 3,691,565 A | * | 9/1972 | Galonek | 2/431 |
| 3,833,935 A | * | 9/1974 | Ansite et al. | 2/6.2 |
| 3,910,269 A | * | 10/1975 | Ansite et al. | 128/201.24 |
| 4,224,694 A | * | 9/1980 | Palmaer | 2/422 |
| 4,287,615 A | | 9/1981 | Morin | |
| 4,432,100 A | | 2/1984 | Bates | |
| 4,686,712 A | * | 8/1987 | Spiva | 2/10 |
| 4,887,320 A | * | 12/1989 | Long et al. | 2/424 |
| 4,907,300 A | * | 3/1990 | Dampney et al. | 2/424 |
| 5,012,528 A | * | 5/1991 | Pernicka et al. | 2/10 |
| 5,187,502 A | | 2/1993 | Howell | 351/44 |
| 5,467,480 A | * | 11/1995 | Baudou et al. | 2/6.5 |
| 5,752,280 A | | 5/1998 | Hill | |
| 6,094,751 A | * | 8/2000 | Parks | 2/431 |
| 6,119,276 A | * | 9/2000 | Newcomb et al. | 2/425 |
| 6,282,726 B1 | * | 9/2001 | Noyerie et al. | 2/424 |
| 6,481,025 B2 | * | 11/2002 | Hill | 2/453 |
| 6,804,829 B2 | | 10/2004 | Crye et al. | |
| 6,845,548 B1 | * | 1/2005 | Lin | 24/265 BC |
| 8,082,600 B2 | * | 12/2011 | Morin | 2/424 |
| 2002/0029399 A1 | * | 3/2002 | Hill | 2/13 |
| 2004/0143879 A1 | | 7/2004 | Robertson | |
| 2008/0072364 A1 | | 3/2008 | Schimpf | |
| 2008/0263754 A1 | * | 10/2008 | Folkesson | 2/453 |
| 2009/0313745 A1 | * | 12/2009 | Kang et al. | 2/424 |

FOREIGN PATENT DOCUMENTS

| | | |
|---|---|---|
| EP | 0603027 | 6/1994 |
| EP | 0668029 | 8/1995 |
| EP | 668029 A1 * | 8/1995 |
| EP | 1312274 A1 * | 5/2003 |
| FR | 2717046 A1 * | 9/1995 |
| FR | 2840778 | 12/2003 |
| JP | 10212618 A * | 8/1998 |

* cited by examiner

HELMET HAVING A GUIDING MECHANISM FOR A COMPATIBLE VISOR

FIELD OF THE INVENTION

The present invention generally relates to the field of helmets. More specifically, the invention relates to a helmet having a guiding mechanism for a compatible visor for use in sports, such as skiing or other activities where it is advantageous to position the visor close to the face of a wearer.

BACKGROUND OF THE INVENTION

The use of protective gear in activities, such as some sports, containing some risk is always recommended. Although occurrence of a serious accident may sometimes be remote, people are becoming more aware that if such accident happens, head injuries are among the most serious injuries a person may suffer. Fortunately, with improved designs, reduced weight and increased comfort, protective helmets have gained tremendous popularity in recent years, especially in sports such as biking and downhill skiing.

Because of wind and cold, skiers very often wear goggles over their helmet. Unfortunately, this is not the most convenient design as wind may infiltrate in between the helmet and the goggles, freezing a wearer's forehead. This is especially true if there is a less than perfect match between the helmet and the goggles.

Furthermore, when the skier gets to the bottom of the slopes and waits in line for the chairlifts, he often takes his goggles off, letting them rest in equilibrium on a front portion of the helmet, retained by the goggles' elastic band. However, if the goggles are not perfectly positioned, they will often either flip up and end up retained by a retaining strap at the back of the helmet, or flip down, striking the eyes of the wearer completely caught off guard.

To mitigate these inconveniences, interesting solutions have been proposed. U.S. Pat. No. 4,287,615 to Morin discloses a ski helmet having an integrated withdrawable visor. The visor is moveable between a deployed position within a wearer's field of view for use of the visor and a retracted position behind a helmet shell. As the visor is deployed, its edges follow a guiding surface against which it is biased by a spring. As the visor reaches its fully deployed position, the guiding surface is made so that the visor moves towards a face of the wearer, sealing his eyes against wind infiltration. However, the movement required to move the visor is not natural as the wearer is required to move a lever, located at the base of the helmet, towards the front to retract the visor and towards the back to deploy the visor. Furthermore, if the wearer intends to retract the visor with a more natural movement, such as by grabbing a bottom portion of the visor with his thumb and pushing up the visor, the visor will likely not retract properly as the wearer, wearing thick gloves or mittens, will often lift the visor too much forward, off its guiding surfaces, resulting in rubbing the visor against the helmet shell and preventing it from retracting properly in its pocket, located between the helmet shell and a helmet liner.

U.S. Pat. No. 6,804,829 to Crye et al. describes a combat helmet. The combat helmet, among others, comprises a retractable visor. The visor is pivotally attached to the helmet and is moveable in an arcuate path between a deployed position within the field of view of the wearer and a retracted position behind a helmet shell. However, because the visor moves in a simple arcuate path, the visor engages the face of the wearer with a downward pressure, thereby providing an unpleasant feeling. Moreover, this downward motion of the shield does not efficiently seal the shield against the face of the wearer.

There is therefore a need for an improved helmet that integrates a visor but that does not have the shortcomings of the prior art.

SUMMARY OF THE INVENTION

It is an object of the present invention to provide a helmet that overcomes or mitigates one or more shortcomings of known helmets, or at least provide a useful alternative.

The invention provides the advantages of being adapted to conveniently integrate a visor with a helmet where the visor seals against the face of a wearer by generating a pressure oriented substantially normally to the face, in a similar fashion to conventional goggles over a ski helmet, while being retractable either within or over a frontal portion of the helmet.

In the following description, the term "confined" will be understood to mean that something, a compatible visor in the present invention, is restricted in its movement. More precisely, the term confined is used to describe that the compatible visor is restricted in its movement to follow a specific path determined by the geometry of guiding mechanisms of the helmet.

In accordance with a first embodiment of the invention, there is provided a helmet comprising a shell adapted to contact a wearer's head, a face seal, a visor and two guiding mechanisms connected to the visor. The shell has a frontal portion and a rear portion, the frontal portion having a frontal lower edge. The visor has a visor lower portion to which is connected the face seal. Each one of the two guiding mechanisms is located on a different side of the shell and is connected to it. The guiding mechanisms are operative to guide at least the visor lower portion along a confined path extending from a retracted position where the visor is substantially proximate the frontal portion of the shell and substantially outside a field of view of the wearer to a deployed position where the visor is substantially below the frontal lower edge and within the field of view of the wearer. The confined path has a path portion, close to the deployed position, that is predominantly oriented towards the rear portion of the shell. The guiding mechanisms are further operative to guide the visor lower portion along the path portion and predominantly in the direction of the rear portion of the shell when the visor is guided from the retracted position to the deployed position so that the face seal is operative to contact a face of the wearer.

Each one of the two guiding mechanisms may further comprise a first link that pivots on a first pivot. Each one of the first link is adapted to pivotably connect to the compatible visor. The first link is in a first position when the compatible visor is in the retracted position and moves to a second position when the compatible visor is in the deployed position.

Optionally, at least one of the two guiding mechanisms may comprise a biasing means operative to bias the visor towards the deployed position and also, optionally, towards the retracted position. The biasing means may be connected to the first link.

Each one of the two guiding mechanisms may be connected to the compatible visor through a visor adaptor that is adapted to receive the compatible visor. The first link is pivotably connected to a lower connecting portion of the visor adaptor at a second pivot.

Optionally, the helmet may be provided with a guiding slot, in which an upper portion of the visor engages. The guiding slot may be located on a centerline of the shell.

Each one of the two guiding mechanisms may further comprise a second link pivoting on a second pivot. The first link and the second link are adapted to pivotably connect to the compatible visor respectively at a third pivot and at a fourth pivot. The third pivot may be located substantially below the first pivot and the fourth pivot may be located substantially above the second pivot when the compatible visor is in the deployed position. This configuration may be arranged so that the third pivot is located substantially above the first pivot and the fourth pivot is located substantially above the second pivot when the compatible visor is in the retracted position.

Optionally, the shell may be provided with a pocket adapted to receive the visor when the visor is in the retracted position. The pocket may be located between an outer shell and a liner of the shell.

In accordance with a second embodiment of the invention, there is provided a helmet for receiving a compatible visor. The helmet comprises a shell adapted to contact a wearer's head, the shell having a frontal portion and a rear portion, the frontal portion having a frontal lower edge, and two guiding mechanisms adapted to receive the compatible visor. Each one of the two guiding mechanisms is located on a different side of the shell. The guiding mechanisms are operative to guide at least a lower portion of the compatible visor along a confined path extending from a retracted position where the compatible visor is substantially proximate the frontal portion of the shell and substantially outside a field of view of the wearer to a deployed position where the compatible visor is substantially below the frontal lower edge and within the field of view of the wearer. The guiding mechanisms are further operative to guide the lower portion of the compatible visor substantially in the direction of the rear portion of the shell when the compatible visor is guided from the retracted position to the deployed position.

Optionally, the helmet may be provided with the compatible visor which is equipped with a face seal operative to contact a face of the wearer.

Each one of the two guiding mechanisms may further comprise a first link pivoting on a first pivot, each one of the first link being adapted to pivotably connect to the compatible visor. The first link is in a first position when the compatible visor is in the retracted position and the first link is in a second position when the compatible visor is in the deployed position.

Each one of the two guiding mechanisms may be adapted to be connected to the compatible visor through a visor adaptor itself adapted to receive the compatible visor.

Optionally, the helmet may be provided with a guiding slot located on a centerline of the shell and adapted to engage and to guide an upper portion of the compatible visor.

In the case where no guiding slot is used, each one of the two guiding mechanisms may further comprise a second link pivoting on a second pivot. The first link and the second link are adapted to pivotably connect to the compatible visor respectively at a third pivot and at a fourth pivot, wherein the third pivot is located substantially below the first pivot and the fourth pivot is located substantially above the second pivot when the compatible visor is in the deployed position, and wherein the third pivot is located substantially above the first pivot and the fourth pivot is located substantially above the second pivot when the compatible visor is in the retracted position.

The helmet may be of an open-face type.

BRIEF DESCRIPTION OF DRAWINGS

These and other features of the present invention will become more apparent from the following description in which reference is made to the appended drawings wherein.

DETAILED DESCRIPTION OF THE INVENTION

The present invention relates to a helmet adapted to receive a compatible visor. The visor moves along a confined path from a retracted position proximate a frontal portion of the helmet and substantially outside a field of view of the wearer to a deployed position substantially below a frontal lower edge and substantially within the field of view of a wearer. A lower portion of the visor is guided so that the visor contacts the face of the wearer in a direction towards a back of the helmet so that the visor seals against the face with a pressure that is applied in a direction substantially normal to a surface of the face. When the visor is moved back to its retracted position, it is guided so that it enters an optional storage pocket in the frontal portion of the helmet without rubbing against an outer shell of the helmet.

The helmet described herein may be used in many types of applications, sometimes with variations in its impact-absorbing structure. For example, the helmet of the present invention may be used in many activities such as skiing, biking, motorcycling and many more.

Although the helmet of the present invention may be provided without the visor, the description will be made with respect to the helmet already equipped with the visor since it will most often be used as such. For example, the helmet of the present invention could be provided with a pre-installed visor, or as a kit. Furthermore, although the helmet is depicted in the figures as being of an open-face type, the invention may optionally be adapted to other types of helmets such as motocross helmets.

Figure 1:
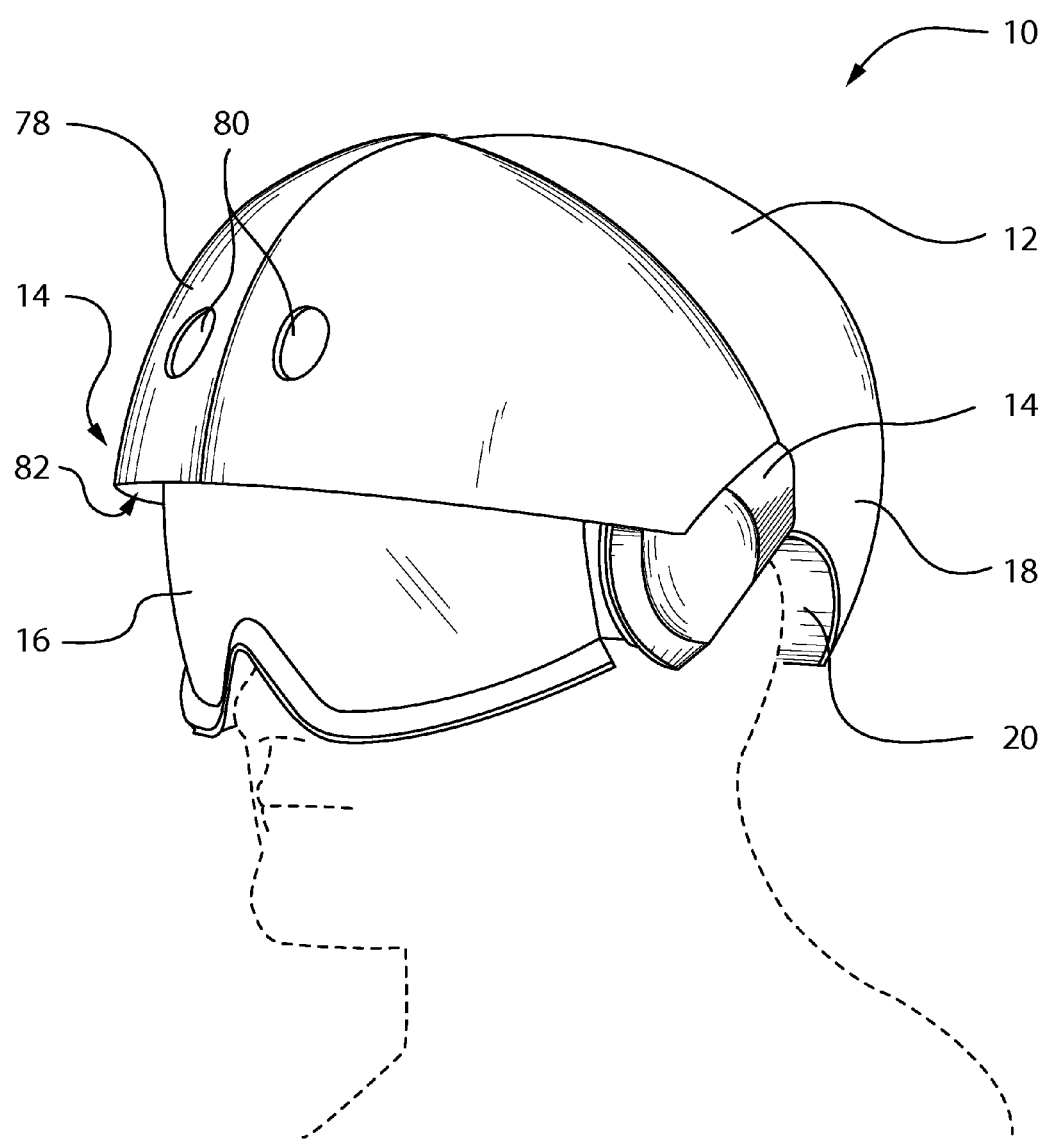
FIG. 1 is an axonometric view of a helmet with a compatible visor in a deployed position in accordance with an embodiment of the present invention.

FIG. 1 depicts a helmet 10 according to a first embodiment of the present invention. The helmet 10 comprises a shell 12, two guiding mechanisms 14 (one on each side of the helmet 10) and a visor 16. The shell 12 is operative to contact a wearer's head and to protect the head by absorbing the energy from an unfortunate impact. The shell 12 typically comprises an outer shell 18, on the exterior of the shell 12 and which is mostly used to distribute the impact over a larger area while providing a nice exterior cosmetic appearance, and an impact energy absorbing liner 20, inside the outer shell 18. The liner 20 fits the head of the wearer and acts as a damper by absorbing most of the impact energy by deformation so that as little energy as possible is transferred to the head. Typically, high-density foam is used as the liner material.

Figure 2:
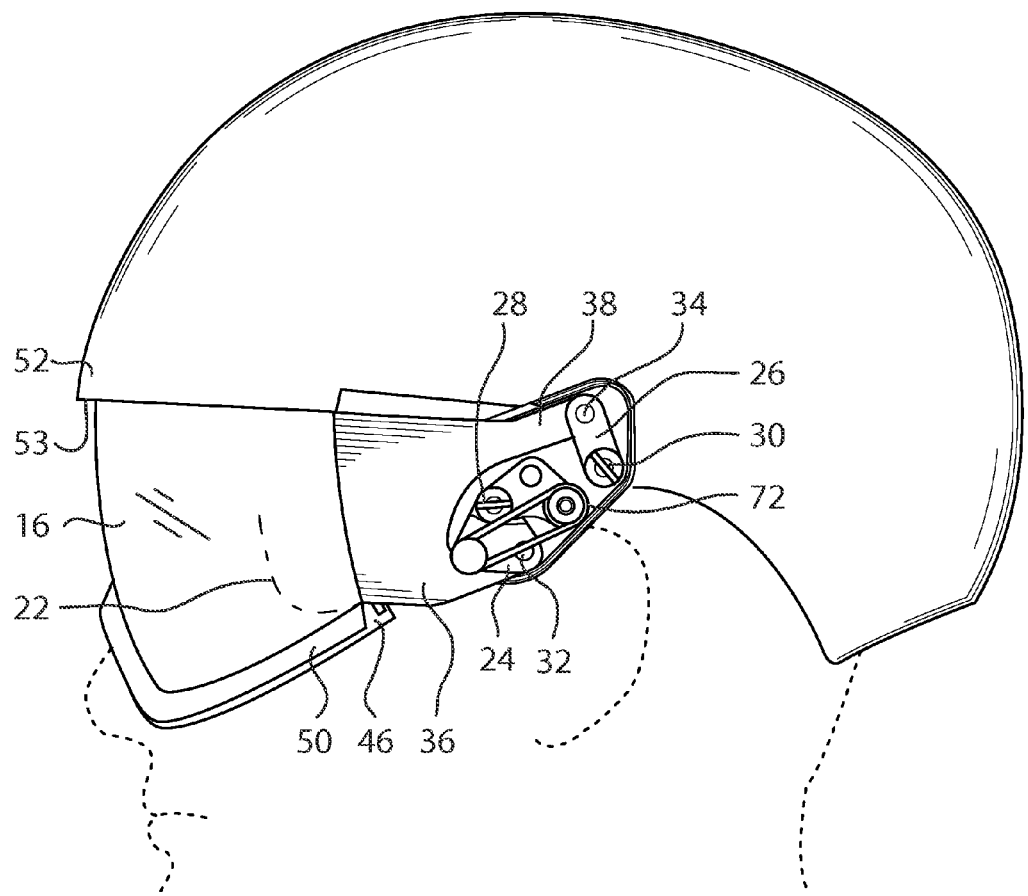
FIG. 2 is a side view of the helmet of FIG. 1, without a visor cover, showing both the detail of a guiding mechanism and a confined path followed by a virtual reference point located at a bottom portion of the visor, which is shown in its deployed position.

Each guiding mechanism 14 is located on a different side of the shell 12 and both are adapted to receive and to guide the visor 16 along a confined path 22, best shown in FIG. 2 and now concurrently referred to. On FIG. 2, a guiding mechanism cover has been removed to get a detailed view of the inside of the guiding mechanism 14. In this Figure, the left guiding mechanism 14 is represented. It will be understood that the guiding mechanism on the right side of the shell 12 is a mirror image of the one on the left side. Each guiding mechanism 14 comprises a first link 24 and a second link 26. The first and second links 24, 26, respectively pivot on a first and a second pivot 28, 30. The first and second links 24, 26 are pivotably connected to the visor 16 respectively through a third pivot 32 and a fourth pivot 34. More specifically, the first link 24 is pivotably connected to a first connecting portion 36 of the visor 16 while the second link 26 is connected to a second connecting portion 38 of the visor 16. In the present design, the first connecting portion 36 is located lower than the second connecting portion 38 when the visor 16 is in its deployed position.

Figure 3:
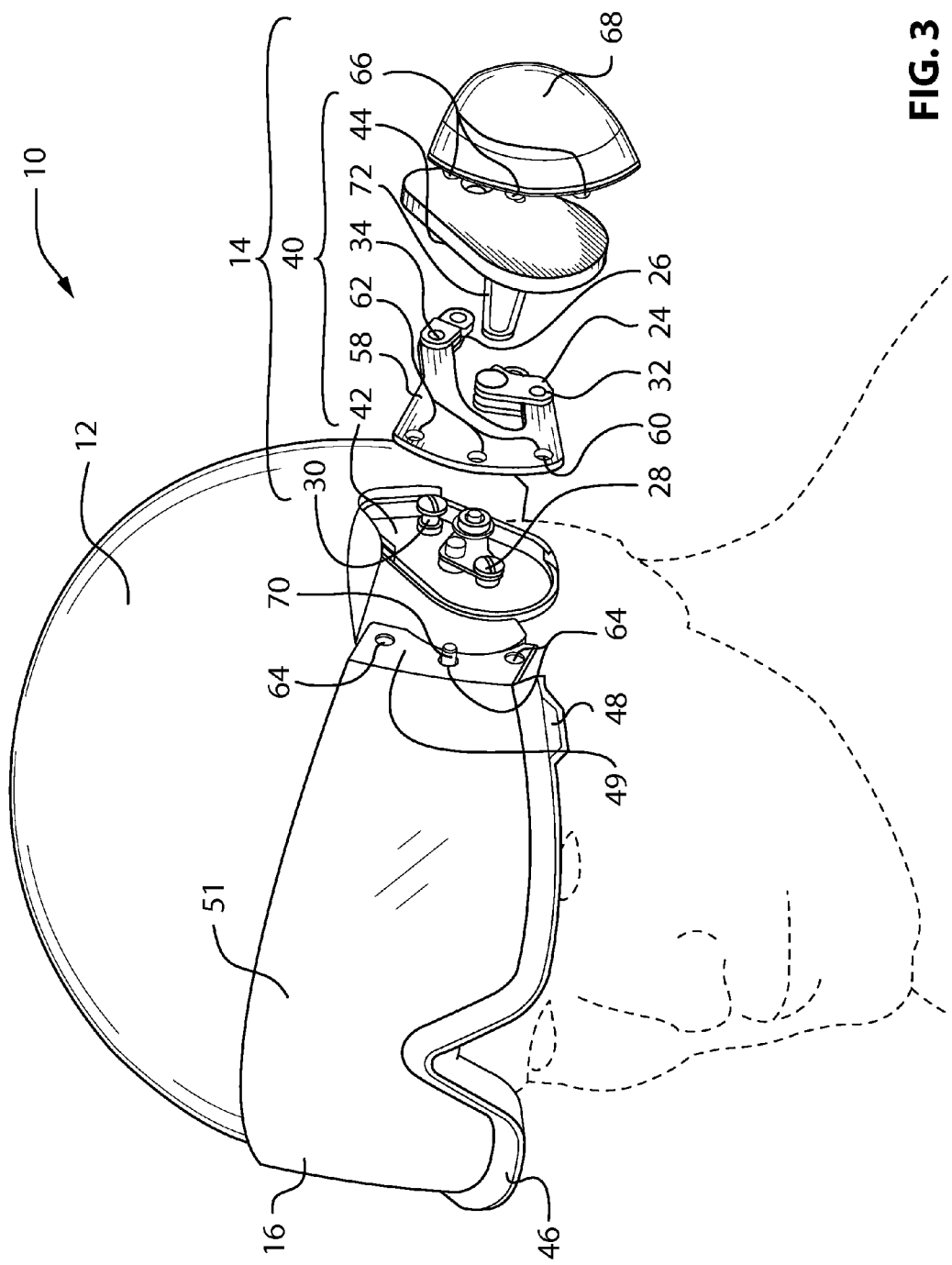
FIG. 3 is an exploded axonometric view of the helmet of FIG. 1 without the visor cover and having the compatible visor in the retracted position.

FIG. 3, where details of the guiding mechanism 14 are shown in an exploded view, is now referred to. Each guiding mechanism 14 comprises a housing 40 having a base 42 and a cover 44. The housing 40 is attached to the shell 12. Optionally, the housing 40 could be integrated in the shell 12 and then the first and second links 24, 26 may be attached directly to the shell 12.

Depending on the helmet's application, the visor 16 may be provided with a face seal 46. For example, if the helmet 10 is a ski helmet, then the visor 16 will most likely be equipped with the face seal 46 as it provides a better seal and improves the comfort of the wearer. The face seal 46 is similar to the face seals of conventional goggles, except that it does not completely surround the visor 16 as in conventional goggles. The face seal 46 is typically made of a soft, resilient plastic and may comprise soft foam to comfortably contact the face of the wearer. As with conventional goggles, the face seal 46 may incorporate vents to provide air circulation and to prevent the visor 16 from fogging. Alternatively, when the helmet 10 is a motorcycle helmet or a bike helmet for example, it may be desirable not to provide the face seal 46 with the visor 16 as the wearer may prefer to leave some wind entering between the visor 16 and his face on a warm day.

The visor 16 may also be provided with a finger-catching tab 48 so that the wearer may move the visor 16 from its retracted position to its deployed position and vice-versa. Although the tab 48 may be located in a variety of positions, it may be more convenient to locate the tab 48 on the face seal 46. Alternatively, the tab 48 could be designed as a recess in the face seal 46.

The visor 16 is mounted to each guiding mechanisms 14 through its helmet mounting interfaces 49. The helmet mounting interfaces 49 may either be integrated with a lens 51 or be two separate parts attached to the lens 51.

Figure 4:
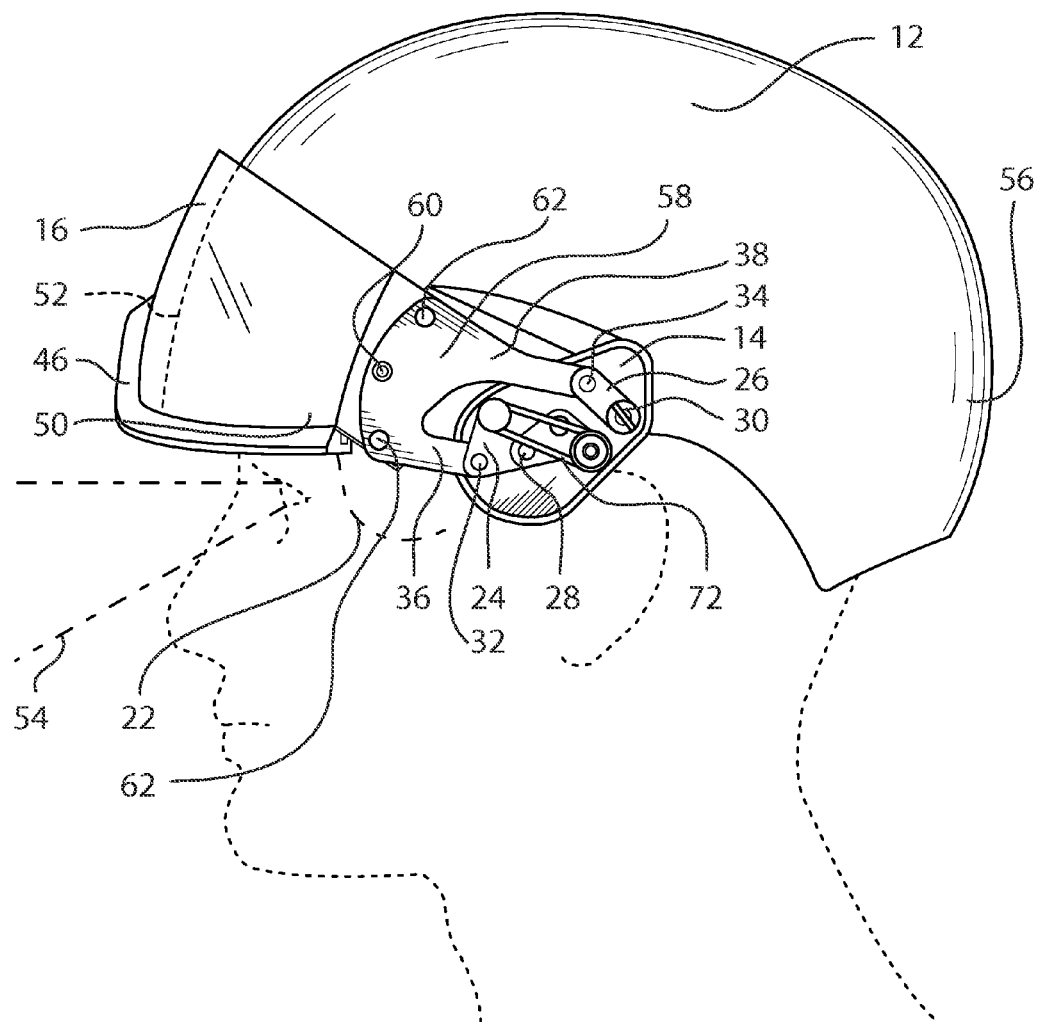
FIG. 4 is side view of the helmet of FIG. 1, without the visor cover, having its visor in its retracted position.

When the user moves the visor 16 from its retracted position to its deployed position and vice-versa, the visor 16 follows the confined path 22. In fact, every single virtual point on the visor 16 actually follows its own single confined path 22. For the sake of clarity, the confined path 22 depicted in FIGS. 2 and 4 is the confined path followed by one virtual reference point located in a lower portion 50 of the visor 16, here more specifically on the face seal 46. The confined path 22 depicts the movement of this virtual reference point that extends from the retracted position of the visor 16, as depicted in FIG. 4, to the deployed position of the visor 16, as depicted in FIG. 2. In the retracted position, the visor 16 is substantially proximate the frontal portion 52 of the shell 12 and substantially outside a field of view 54 of the wearer. In the deployed position, the visor 16 is substantially below a frontal lower edge 53 and within the field of view 54 of the wearer. As can be seen from the shape of the confined path 22, the guiding mechanisms 14 guide at least the lower portion 50 of the visor 16 substantially towards a rear portion 56 of the shell 12 when the compatible visor 16 is in the deployed position. Indeed, the confined path 22 turns towards the rear portion 56 in its lower part. This rearward motion of the lower portion 50 of the visor 16 advantageously allows the lower portion 50, and more specifically the face seal 46, to contact the face of the wearer and seal against it, thereby preventing wind from seeping in between the visor 16 and the face of the wearer. The rearward motion of the lower portion 50 of the visor 16, although not purely rearward, is still predominantly directed towards the rear portion 56 of the shell 12. This is in contrast with visor motion of the prior art where the visors often pivot around a single axis and have a predominantly downward direction of motion when they reach within the field of view of the wearer.

It will be noticed that the confined path 22 depicted in FIGS. 2 and 4 is the same whether the visor 16 is moving from its retracted position to its deployed position or from its deployed position to its retracted position. However, this does not necessarily need to be the case. Indeed, the visor 16 could follow a slightly different trajectory whether it is retracting or deploying, as long as the visor 16 does not substantially come into contact with the outer shell 18 or the liner 20, which could damage the visor 16. The important objective is that the guiding mechanism 14 does not allow any substantial movement of the visor 16 outside of the confined path 22, which could prevent the visor 16 to properly move to its retracted position, either over the outer shell 18, or between the outer shell 18 and the liner 20.

Whereas FIG. 2 depicts the visor 16 directly mounted to the guiding mechanisms 14, FIGS. 3 to 4 depict the visor 16 connected to each guiding mechanism 14 through an optional visor adaptor 58. Although the visor 16 may be directly connected to the guiding mechanisms 14 it is convenient to use the visor adaptors 58 to receive the visor 16 since their visor mounting interface 60 is more accessible than are the first and second links 24, 26 located inside the housing 40. Using the visor adaptors 58 to connect the visor 16 to the guiding mechanisms 14 allows for a quick replacement of the visor 16, for example if the wearer wants to replace his visor for one better adapted to the ambient type of lighting, or if the visor 16 becomes scratched.

In this embodiment, the visor adaptors 58 comprise the first and the second connecting portions 36, 38 similarly to the visor 16 of FIG. 2. The first link 24 is connected to the first connecting portion 36 of the visor adaptor 58 at the third pivot 32 and the second link 26 is connected to the second connecting portion 38 of the visor adaptor 58 at the fourth pivot 34, again similarly to the connections of the first and the second links 24, 26 to the visor 16 of FIG. 2. It may be noted that when the visor 16 is in the deployed position, as in FIG. 2, the first connecting portion 36 is lower than the second connecting portion.

The visor mounting interface 60 may be designed in many different ways such that the visor 16 is quickly and easily detachable from the visor adaptors 58, even by an un-experienced wearer. For example, the visor mounting interfaces 60 may comprise mounting holes 62 on the visor adaptors 58. These mounting holes 62 are designed to match with corresponding visor holes 64 in the visor 16 and both the mounting holes 62 and visor holes 64 are engaged by corresponding bosses 66 in a decorative cover 68. A screw 70 may be used to hold the visor 16 to the decorative covers 68 through the visor adaptors 58, precisely locating the visor 16. The screw 70 may be of a type that may readily be removed with a dime or a screwdriver. It will be apparent to a person skilled in the art that many other types of quick connections may be used.

Optionally the guiding mechanism 14 may further comprise a biasing means 72 to bias the lower portion 50 of the visor 16, and more specifically the face seal 46, towards the rear portion 54 of the shell 12 when the visor 16 is in its deployed position. In fact, when the helmet 10 is worn by the wearer, the biasing means 72 provides a force that pulls the visor 16 against the face of the wearer, similarly to the way an elastic band of conventional goggles would do. This force, pulling the visor 16 towards the rear portion 56 of the shell 12, helps seal the face seal 46 against the face of the wearer, preventing wind and snow from seeping in. Moreover, the biasing means 72 may help the visor 16 stay in its deployed position within the field of view 54 of the wearer. It may also prevent undesired relative motion between the visor 16 and the face of the wearer. Although the biasing means 72 is depicted as an elastic band in FIGS. 2 to 4, it will be apparent to a person skilled in the art that many types of biasing means could be used. For example, the biasing means 72 may be, but is not limited to, any type of spring (coil spring, leaf spring, air spring, etc), an elastic band, etc. Although the biasing means 72 is shown connected to the first link 24, it could also be functionally connected to the visor 16 or the visor adaptor 58.

Further to bias the visor 16 towards the face of the wearer, the biasing means 72 may also bias the visor 16 towards a lower or an upper portion of the confined path 22. In the design depicted in FIGS. 2 to 4, the biasing means 72 attaches between the first link 24 and the shell 12 through a mounting post which is part of the housing 40. As can be seen by comparing both FIGS. 2 and 4, the biasing means 72 is routed below the first pivot 28 when the visor 16 is in its deployed position (FIG. 2) and is routed above the first pivot 28 when the visor 16 is in the retracted position (FIG. 4). In this manner, the biasing means 72 is operative to bias the visor 16 towards an upper portion of the confined path 22, or towards the fully retracted position of the visor 16, as long as the biasing means 72 is routed above the first pivot 28. However, the biasing means 72 is also operative to bias the visor 16 towards a lower portion of the confined path 22, or towards the fully deployed position of the visor 16, when the biasing means 72 is routed below the first pivot 28.

In use, the wearer would move the visor 16 from its initial position, for example the retracted position, to the deployed position by pulling on the tab 48. Once the biasing means 72 passes below the first pivot 28, it starts pulling the visor 16 towards the lower part of the confined path 22 so that at least the lower portion of the visor 16 contacts the face of the wearer. Once the biasing means 72 passes from above the first pivot 28 to below the first pivot 28, the wearer does not have to pull on the tab 48 and the visor is deployed automatically by the biasing means 72 for the remainder of the confined path 22.

Many variations and effects may be achieved through varying the routing and the positioning of the biasing means 72. These variations are within the reach of a person skilled in the art. For example, the biasing means 72 may be used to only bias the visor 16 towards the lower portion of the confined path 22 (deployed biased), towards the upper portion of the confined path 22 (retracted biased) or, as explained and shown in FIGS. 2 to 4, towards both the upper and the lower portions of the confined path 22, depending where the visor 16 is located in the confined path 22.

Figure 5:
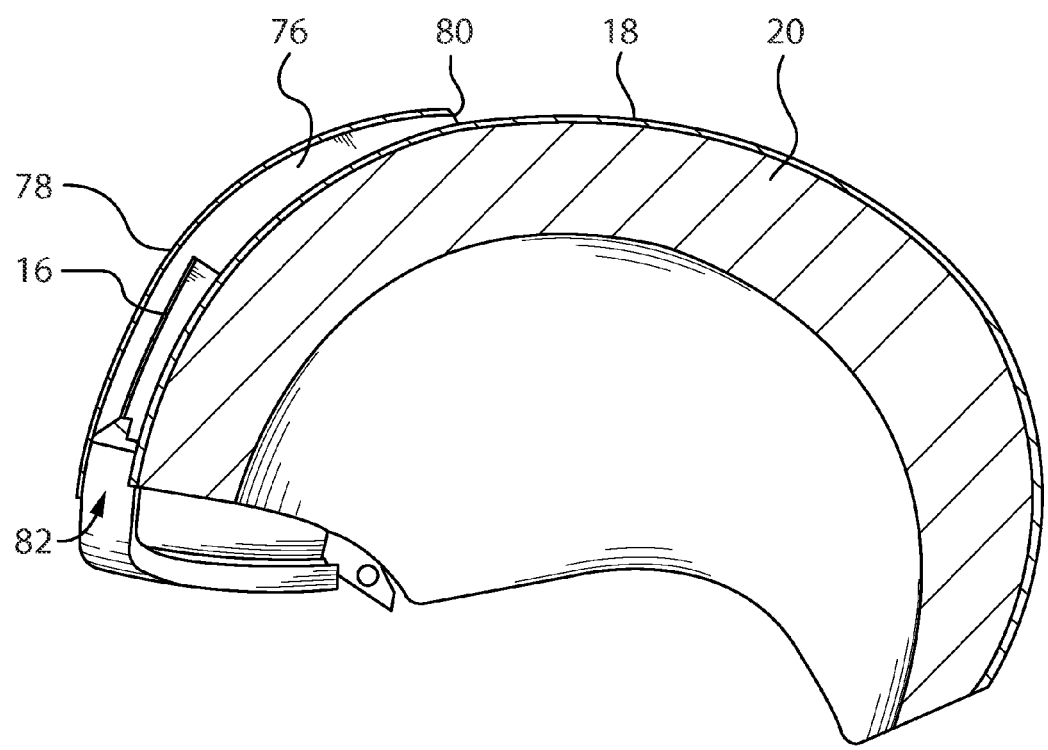
FIG. 5 is a longitudinal cross-sectional side view of the helmet of FIG. 1.

FIGS. 1 and 5 are now referred to. Although the visor 16 may retract over the outer shell 18 as shown in FIGS. 2 to 4 and much in the fashion of a jet fighter pilot helmet, the visor 16 may alternatively retract inside a pocket 76, either located between the outer shell 18 and the liner 20 or between the outer shell 18 and a visor cover 78, which is the option depicted here. To prevent chances of the visor 16 fogging when retracted inside the pocket 76, the outer shell 18 may be provided with one or more openings 80 directly over the retracted visor 16, at the bottom of the pocket 76, or a combination of both. Furthermore, air infiltrating inside the pocket 76 from its front opening 82 may also be channeled over the visor 16 to prevent fogging.

Alternatively, or additionally, the helmet 10 may be equipped with different other convenient mechanisms such as, for example, a catching mechanism that may be used to lock the visor 16 in one of its biased positions, for example, in its retracted position. This catching mechanism may be positioned anywhere it may contact a moveable part, such as the visor 16, the first link 24 or the second link 26, so as to ultimately retain the visor in a given position with respect to the shell 12. For example, the catching mechanism may be located within the housing 40 and catch the first link 24, or at the bottom of the pocket 76 and catch the visor 16 in its retracted position. The catching mechanism may be of the type that is released by a release actuator, like a release button for example, or of the type that releases when a pushing impulse is provided against the catching mechanism.

It may be convenient to combine the release actuator activated catching mechanism that is operative to catch the visor 16 and lock the visor 16 in its retracted position with a visor 16 that is solely biased by the biasing means 72 towards the deployed position.

Furthermore, other types of mechanisms, such as a progressive locating mechanism (mechanisms having multiple pre-set positions) may be used to locate the visor 16. Such progressive locating mechanisms may take many forms.

Figure 6:
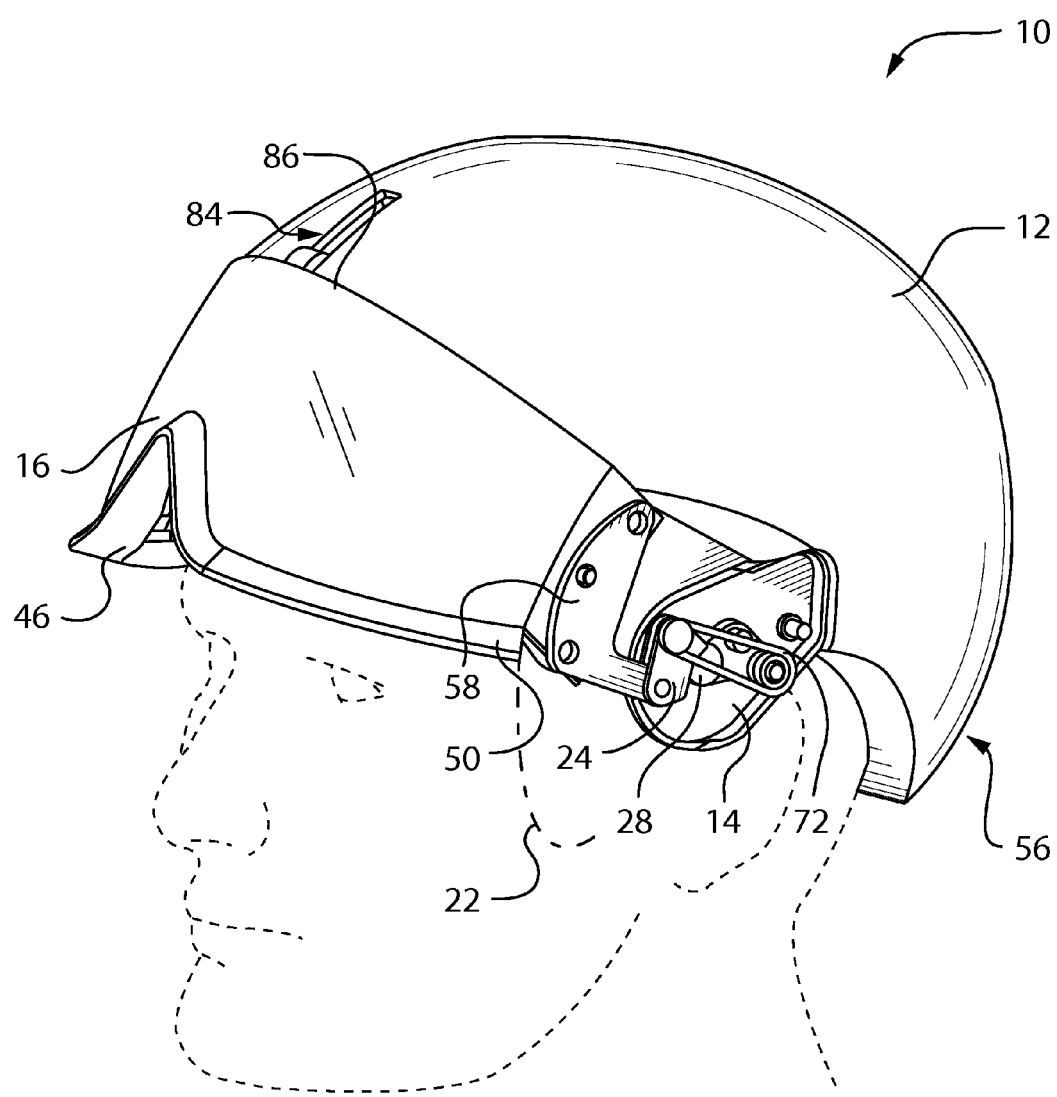
FIG. 6 is an axonometric view of a helmet with a compatible visor in a retracted position in accordance with another embodiment of the present invention.
Figure 7:
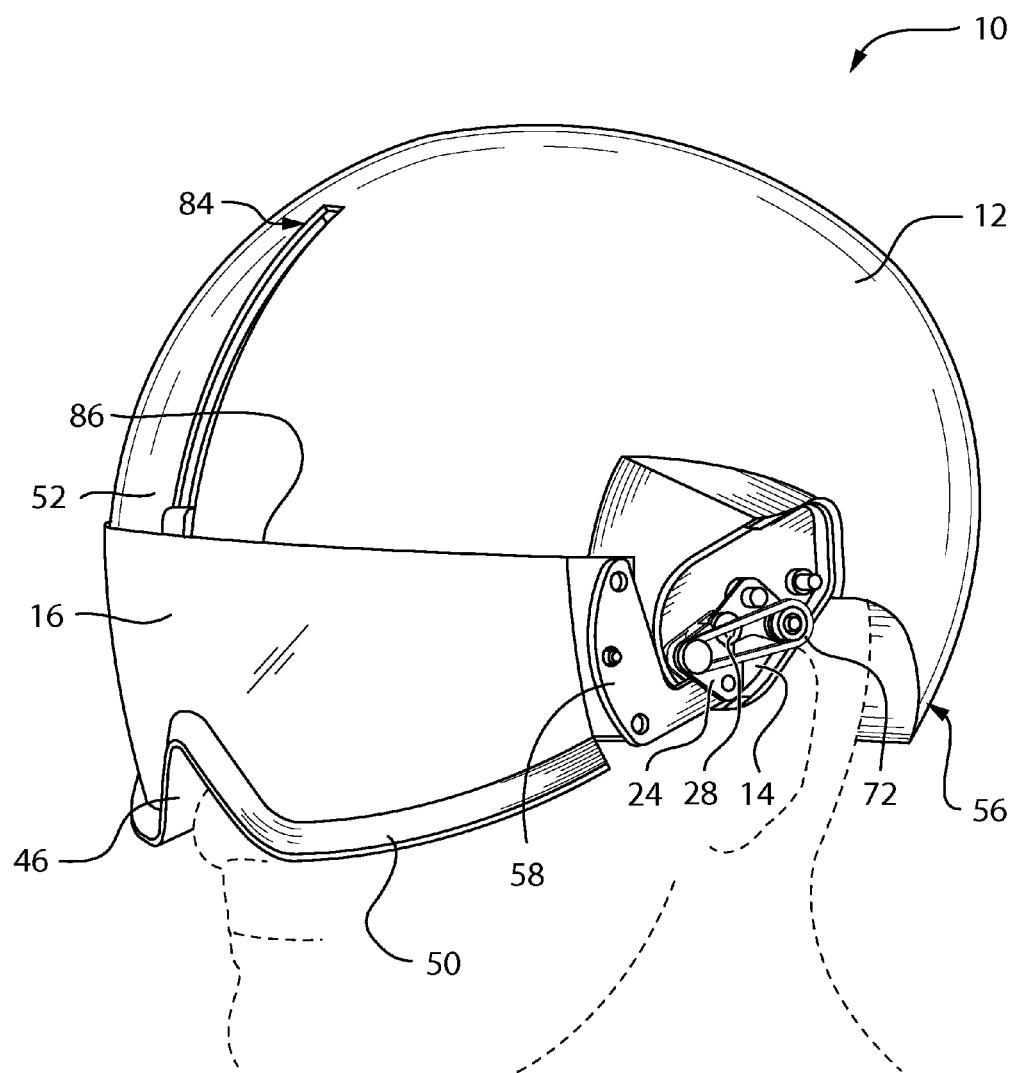
FIG. 7 is an axonometric view of the helmet of FIG. 6 having the visor in the deployed position.

FIGS. 6 and 7, now referred to, depict another embodiment of the present invention. This variant of the invention is somewhat similar to the previous embodiment in that it comprises the two guiding mechanisms 14, each one located on a different side of the shell 12, which are adapted to receive the visor 16. The guiding mechanisms 14 are operative to guide the visor 16 along the confined path 22 which extends from the retracted position, where the visor 16 is substantially proximate the frontal portion 52 of the shell 12 and substantially outside the field of view 54 of the wearer to the deployed position where the visor 16 is mostly below the frontal lower edge 53 (best shown in FIG. 2) and within the field of view 54 (best shown in FIG. 4) of the wearer. When the visor 16 approaches the lower portion of the confined path 22, which corresponds to the deployed position, the guiding mechanisms 14 guide at least the lower portion 50 of the visor 16 substantially toward's the rear portion 56 (best shown in FIG. 4) of the shell 12. This ensures an adequate seal of the visor 16, and more particularly of the face seal 46, against the wearer's face.

Each guiding mechanisms 14 has its first links 24 pivotably connected to the visor 16, either directly or through the visor adaptor 58. Again, each first links 24 pivot on the first pivot 28. In the present embodiment, however, the guiding mechanisms 14 do without the second links, which are replaced by a guiding slot 84 that guides an upper portion 86 of the visor 16. The upper portion 86 of the visor 16 is free to pivot in the guiding slot 84 so that when the visor 16 is moved from its retracted position to its deployed position (or vice versa), the first links 24 position the lower portion 50 of the visor 16 while the upper portion 86 of the visor 16 slides, and slightly pivots, within the guiding slot 84.

The guiding slot 84 may be located on a longitudinal centerline of the shell 12, either within the shell 12, on the surface of the shell 12, or on an interior of the visor cover 78 (not shown) inside the pocket 76 (not shown). Alternatively, two guiding slots 84 may be used, one on each side of the shell 12 so as to guide each side of the upper portion 86 of the visor 16.

Figure 8:
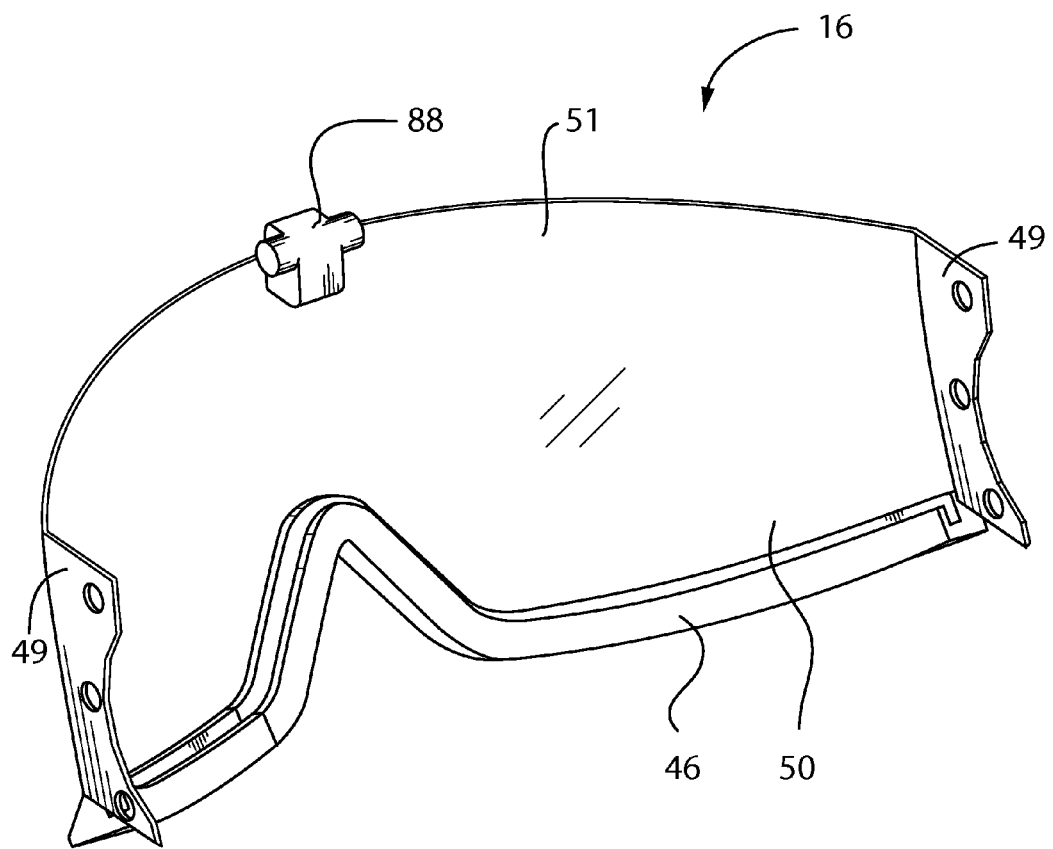
FIG. 8 is an axonometric view of the compatible visor featured in FIG. 6.
Figure 9:
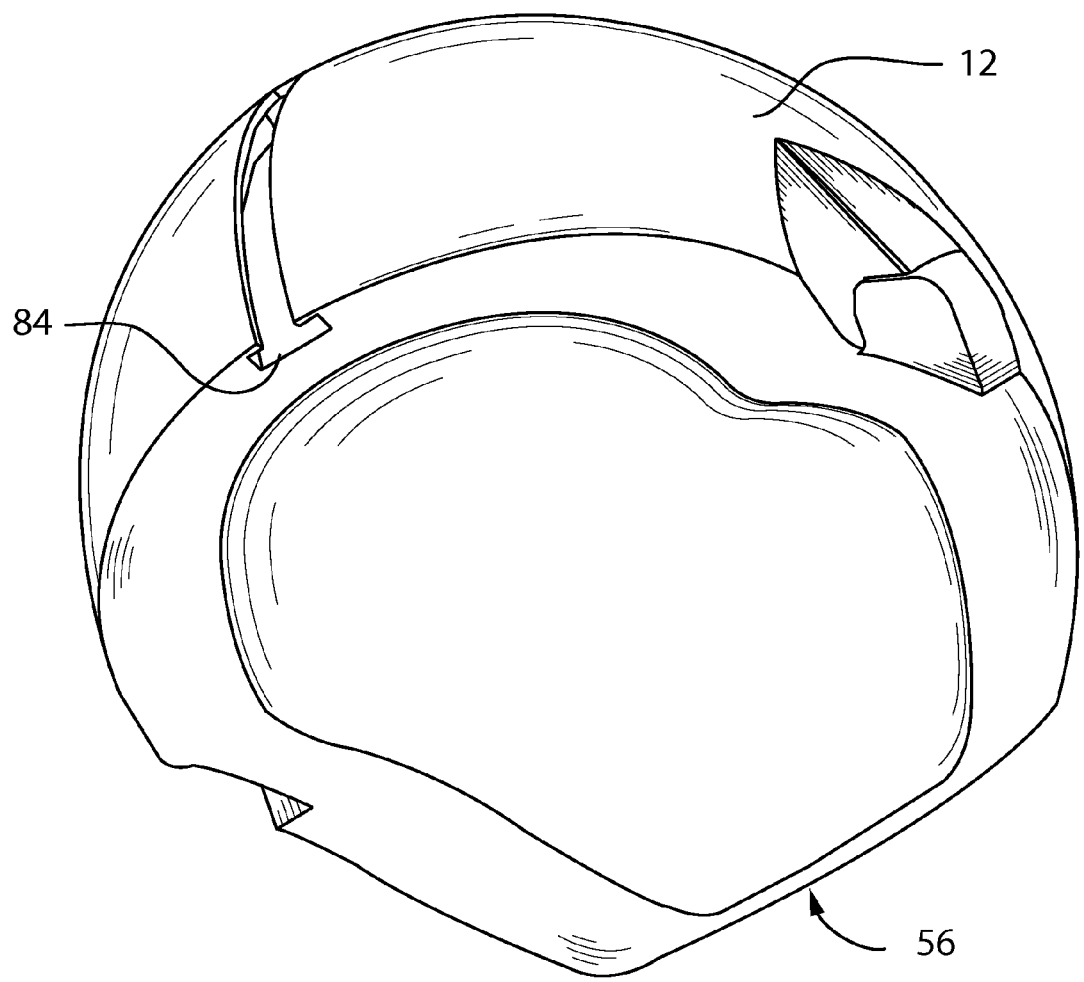
FIG. 9 is an axonometric view of a shell of the helmet featured in FIG. 6.

The guiding slot 84 may adopt different cross-sections, such as an inverted "T" shape that is operative to engage a guiding interface 88 such as a guiding boss, best shown in FIG. 8, now concurrently referred to, located in the upper portion 86 of the visor 16. An example of the "T" shaped guiding slot 84 is depicted in FIG. 9, now concurrently referred to.

Advantageously, the guiding interface 88 adopts a cylindrical shape that allows it to simultaneously slide and pivot within the guiding slot 84. This allows the guiding mechanisms 14 to guide the lower portion 50 of the visor 16 towards the rear portion 56 of the shell 12.

Although not shown in the drawings, it will be apparent to the person skilled in the art that the guiding slot 84 and guiding interface 88 could adopt different alternative operative designs. For example, the visor 16 could be equipped with the guiding slot 84 (albeit shorter than that currently shown on the shell 12) which would engage the guiding interface 88 (which would be extended to look more like a protrusion) extending along the front portion of the shell 12. Such alternative designs that perform the same function are intended to be covered by the present description.

As with the previously described embodiment, the biasing means 72 may be used to bias the visor 16, directly or through one or both first links 24, from the deployed position to the retracted position, from the retracted position to the deployed position, or towards both as described previously. For example, in FIGS. 6 and 7, the guiding mechanism 14 is designed so that the biasing means 72 will bias the visor 16 towards the retracted position when the visor is in the upper portion of the confined path 22 and towards the deployed position when the visor 16 is the lower portion of the confined path 22.

It will be apparent that other options described before, such as the catching mechanism, release actuated catching mechanism, and progressive locating mechanism may be adapted to the present embodiment as well as with the previous embodiment of the present invention.

Furthermore, it could be envisioned that other means of actuating the visor 16 than the tab 48 could be used to activate the visor 16 from the deployed position to the retracted position and vice-versa, for example, different types of mechanical systems, using known concepts such as cams, lever, knobs, gears, etc. Moreover, pneumatic or electric actuators, and electric motors could be used as well in a system that activates the visor 16. Most of these alternative actuating means could also be used to adjust the force with which the visor 16 seals against the face of the wearer. All of these actuating means could be used either by themselves or in combination with the biasing means 72.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

I claim:

1. A helmet comprising:
a shell adapted to contact a wearer's head, said shell having a frontal portion and a rear portion, said frontal portion having a frontal lower edge;
a face seal;
a visor having a visor lower portion, said face seal being connected to said visor lower portion;
two guiding mechanisms, each one of said two guiding mechanisms being located on a different side of said shell, each one of said two guiding mechanisms further having a first unyielding structural element and a second unyielding structural element, said first and said second unyielding structural elements being connected to said shell respectively through a first pivot and a second pivot, said first and said second unyielding structural elements being connected to said visor respectively through a third pivot and a fourth pivot, said first and said second unyielding structural element collaborating so as to define a pre-determined trajectory along which said guiding mechanisms are operative to guide at least said visor lower portion, said pre-determined trajectory extending from a retracted position where said visor is substantially proximate said frontal portion of said shell and substantially outside a field of view of the wearer to a deployed position where said visor is substantially below said frontal lower edge and within the field of view of the wearer and where said face seal is operative to contact a face of the wearer, said pre-determined trajectory having a first trajectory portion and a second trajectory portion, said first trajectory portion extending predominantly downwardly from said retracted position to said second trajectory portion, said second trajectory portion extending predominantly rearwardly from said first trajectory portion to said deployed position and predominantly perpendicular to a face of the wearer, said third pivot being located substantially in front of said first pivot when said visor is in said retracted position and being located substantially below said first pivot when said visor is in said deployed position; said fourth pivot is located substantially above said second pivot when said visor is in said deployed position and
a biasing means, said biasing means connecting one of said visor and said first unyielding structural element of at least one of said guiding mechanisms to said shell, said biasing means being operative to bias said visor towards said deployed position,
wherein said third pivot and said fourth pivot are located so as to move predominantly perpendicularly to the face of the wearer and predominantly in the direction of said rear portion of said shell when said guiding mechanisms guide said visor lower portion along said second trajectory portion predominantly in the direction of said rear portion of said shell so that said face seal is operative to predominantly perpendicularly contact the face of the wearer under a bias of said biasing means.

2. The helmet of claim 1 wherein said first unyielding structural element is a first ink and said second unyielding structural element is a second link.

3. The helmet of claim 2 wherein sad biasing means is operative to bias said visor towards said retracted position.

4. The helmet of claim 2 wherein each one of said two guiding mechanisms is removably connected to said visor through a visor adaptor, said visor adaptor being connected to said visor through a quickly detachable type of connection, said first link being pivotably connected to a lower connecting portion of said visor adaptor at said third pivot.

5. The helmet of claim 2 wherein said shell comprises a pocket adapted to receive said visor when said visor is in said retracted position.

6. The helmet of claim 1 wherein said visor further has a top portion and two side portions, said two side portions being free from having said face seal.

* * * * *